(12) United States Patent
Cassell

(10) Patent No.: US 10,800,240 B2
(45) Date of Patent: Oct. 13, 2020

(54) VEHICLE COVER DEVICE AND DESIGN

(71) Applicant: David L Cassell, Blairsville, GA (US)

(72) Inventor: David L Cassell, Blairsville, GA (US)

( * ) Notice: Subject to any disclaimer, the term of this patent is extended or adjusted under 35 U.S.C. 154(b) by 92 days.

(21) Appl. No.: 16/350,817

(22) Filed: Jan. 16, 2019

(65) Prior Publication Data

US 2020/0223301 A1     Jul. 16, 2020

(51) Int. Cl.
| | |
|---|---|
| *B60J 11/04* | (2006.01) |
| *B32B 5/18* | (2006.01) |
| *B32B 5/02* | (2006.01) |
| *B32B 5/24* | (2006.01) |

(52) U.S. Cl.
CPC ............... *B60J 11/04* (2013.01); *B32B 5/02* (2013.01); *B32B 5/18* (2013.01); *B32B 5/245* (2013.01); *B32B 2250/03* (2013.01); *B32B 2262/08* (2013.01); *B32B 2266/0278* (2013.01); *B32B 2307/7265* (2013.01)

(58) Field of Classification Search
CPC ....................................................... B60J 11/04
See application file for complete search history.

(56) References Cited

U.S. PATENT DOCUMENTS

| | | | | |
|---|---|---|---|---|
| 6,070,629 A | * | 6/2000 | Whiteside | B60J 11/00 |
| | | | | 150/166 |
| 8,146,984 B2 | * | 4/2012 | Devereaux | B60J 11/00 |
| | | | | 150/166 |
| 2010/0326017 A1 | * | 12/2010 | Kindel | B60J 11/00 |
| | | | | 53/461 |
| 2012/0285588 A1 | * | 11/2012 | Sheppard | B60J 11/04 |
| | | | | 150/166 |
| 2013/0115394 A1 | * | 5/2013 | Rich | B32B 3/02 |
| | | | | 428/35.2 |
| 2014/0015274 A1 | * | 1/2014 | Banda | B60J 11/04 |
| | | | | 296/136.02 |
| 2018/0043762 A1 | * | 2/2018 | Blanco | B60J 11/08 |
| 2018/0170164 A1 | * | 6/2018 | Wingard | B32B 3/08 |
| 2019/0193544 A1 | * | 6/2019 | Gallego | B60J 11/04 |

* cited by examiner

*Primary Examiner* — Joshua T Kennedy

(57) ABSTRACT

A multi-layered vehicle cover that protects a vehicle from hail and other foreign objects that may occur during a storm. The cover's weather resistant and waterproof layer is to better provide a barrier of protection for a vehicle's outer surface during a storm. The cover's resilient layer, uses a cushioning material, polyurethane foam that absorbs the force of contact with the foreign object. It will dissipate the force over a larger surface area to prevent damage. The cover can also be used as a normal vehicle cover to help protect the vehicle even while not in the middle of a storm. The cover is easily rolled onto the vehicle and held in place with magnets and just as easily can be removed from the vehicle and rolled and stored inside the vehicle.

3 Claims, 6 Drawing Sheets

200

VEHICLE COVER DEVICE AND DESIGN

BACKGROUND OF INVENTION

1. Field of the Invention

The present invention generally relates to a vehicle cover, more specifically to covers which protect from hail and debris.

2. Description of Related Art

In the past, bulky, expensive and complex designs were being used to properly protect a vehicle from hail and debris, with a possibility of increased hassle and expense incurred by the user.

So as to reduce the complexity and length of the Detailed Specification, and to fully establish the state of the art in certain areas of technology, Applicants herein expressly incorporates by reference all of the following materials identified in each numbered paragraph below.

The prior art in *Hail protective vehicle* cover by Jerry L. Timerman in U.S. Ser. No. 8/208,482 uses a sheet of cloth, several foam runners, and several attaching straps to protect the vehicle. The foam runners, preferably having a rectangular cross section, attaches to the underside of the cloth. When placed on a vehicle, the foam runners support the cloth in a spaced apart relationship with the top of the vehicle.

U.S. Pat. No. 6,439,644 *Hail cover for vehicles* by Shaun P. Jester uses a flexible cover having an air blower for constantly supplying air to the cover along with spring-loaded outlet air valves whereby a preset pressure is maintained in the cover. The cover operates somewhat on the principle of a hovercraft according to dynamic physics. An air blower is also provided along with straps for holding the cover onto the vehicle.

U.S. Pat. No. 6,044,881 in Protective hail cover for vehicles by Robert E. Welch uses a flexible shell that is located over the surface of the vehicle. The shell is spaced from the surface by at least one inflatable tube. The inflatable tube is coupled to the underside of the shell by way of an attachment tube. The attachment tube is coupled to the underside of the shell by way of one or more flaps. The attachment tube has an interior cavity that receives the inflatable tube therein. The attachment tube has plural lengths, with each length extending adjacent to at least one other length.

U.S. Pat. No. 6,893,074 in Mobile vehicle hail cover by Timothy David Wilson comprises 2 to 3 composite protective cover sheets of flexible rubberized and weatherproof material. The cover sheet for the roof, is connected to the sheets on the hood and trunk by way of elastic straps.

U.S. application Ser. No. 11/825,858 in Automobile hail auto, pick-up, SUV, and RV cover to help prevent damage vehicles during hail storms by Glen Ralph Hunt uses an air pump that can be directly connected to the vehicle's battery as well as a low and high pressure control valve to keep the cushion inflated to the optimal pressure.

U.S. Pat. No. 5,800,006 in Impact protective vehicle cover by William Dean Pettigrew uses a reversible waterproof vinyl on two sides of an impact resistant plastic material to cover the top, sides, front, and rear surfaces of a vehicle. The impact resistant material transmits the force of the impact to its opposing side to reduce the amount of force per unit of area so as to prevent damage as the force is transmitted to the vehicle.

Applicants believe that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicants will amend the specification to expressly recite the essential material that is incorporated by reference as allowed by the applicable rules.

SUMMARY OF THE INVENTION

In various representative aspects, the present invention includes a vehicle cover composite to protect the vehicle from hail and debris.

A cover is described as having multiple layers designed to provide a buffer of protection for a vehicle's exterior surface during storms. A vehicle finish can be subject to damage and expensive repair based on contact with foreign objects during a storm. The multiple layers provide for a resilient interior layer encased by weather resistant or waterproof outer layers. The resilient layers absorb the force of contact with the incoming object and dissipates the force over a larger surface area to prevent damage to the vehicle. A case is also described for storage of the device.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

The following description may refer to elements or features being "coupled" together. Although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. Furthermore, it should be noted that many alternative or additional functional relationships or physical connections may be present in an embodiment of the subject matter.

The exemplary embodiments of the present invention may employ various vehicle covers, and the like, which may carry out a variety of functions. Further, exemplary embodiments of the present invention may employ any number of conventional techniques for an assembly of the vehicle cover and the like. As such, the examples presented herein are intended as non-limiting.

Figure 1A:
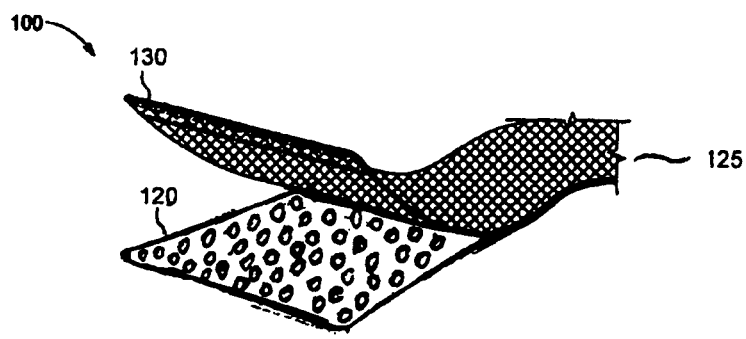
FIGS. 1A and 1B are side-view diagrams showing the intermediate and bottom layers of the vehicle cover.
Figure 1B:
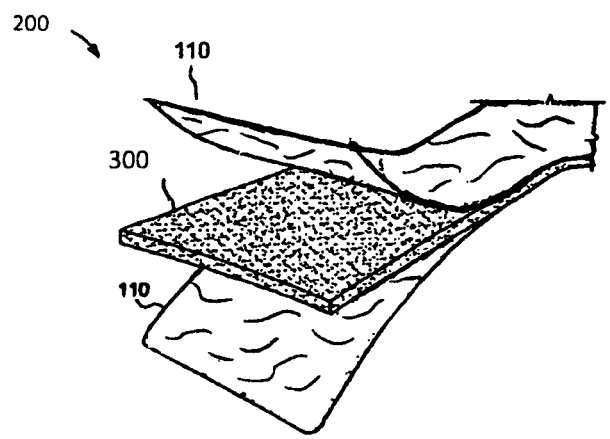

FIGS. 1A and 1B are perspective views of the multi-layer vehicle cover 100 according to an embodiment. The multi-layered vehicle cover 100 comprises three primary layers: a first or bottom layer 200, and intermediate layer 125, and a top layer 130. The bottom layer 200 includes at least one layer of a fine material such as silk, which acts as a means for protecting the vehicle's finish from scratches.

The intermediate layer 125, which rests above bottom layer 200, is made of cushioning material 120. In FIG. 1A, the cushioning material 120 of the intermediate layer is industrial strength heavy duty bubble wrap. In FIG. 1B, the cushioning material 300 of the bottom layer is polyurethane foam. Alternatively, the cushioning material can be a composite of the two cushioning materials of both FIGS. 1A and 1B. in an additional embodiment, the intermediate layer 125 may consist of two sub-layers comprising one layer of polyurethane foam sandwiched by one layer of bubble wrap. In a preferred embodiment, each of the layers or sub-layers are 3/16 inch thick. The bubble wrap layer may additionally comprise an anti-static coating to its surface to reduce static buildup. The cushioning material makes is possible for the cover 100 to be rolled up and stored without having to wait for air to exit the cover's cavity.

The top layer 130 is a water proof material such as tarpaulin. The top layer 130 can act as a physical shell of protection for the cover 100 so that no moisture or smaller debris will penetrate through.

Figure 2:
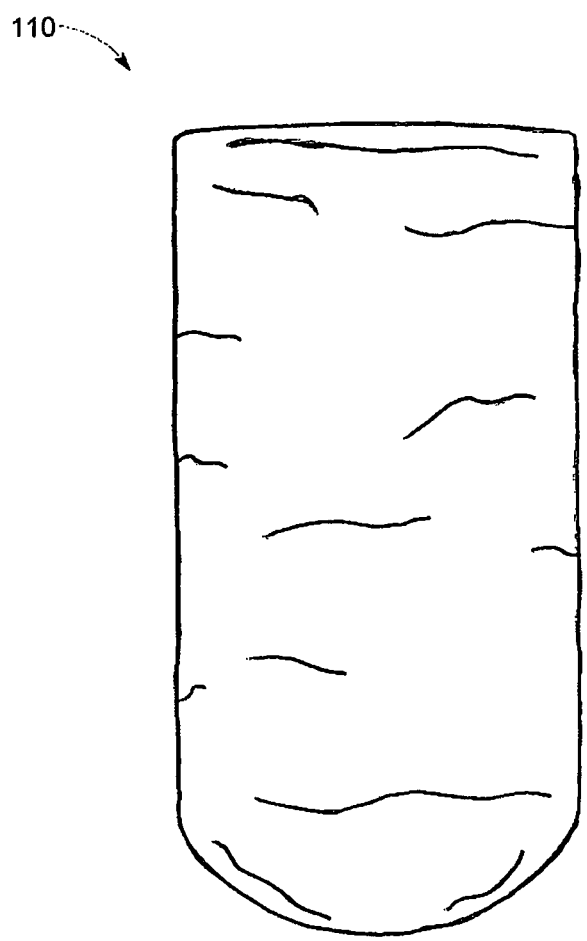
FIG. 2 is a schematic diagram of the bottom silk layer of the vehicle cover according to an embodiment.

FIG. 2 is a top view of the bottom layer 200 according to an embodiment. The bottom layer includes at least one layer of a soft material such as silk so that the vehicle's external surface will not experience any scratching from other layers of the cover 100 or from hail and debris. In a particular embodiment, the bottom layer 200 is 4 ft wide and 16 ft long in order to properly cover the top surface of the vehicle.

Figure 3:
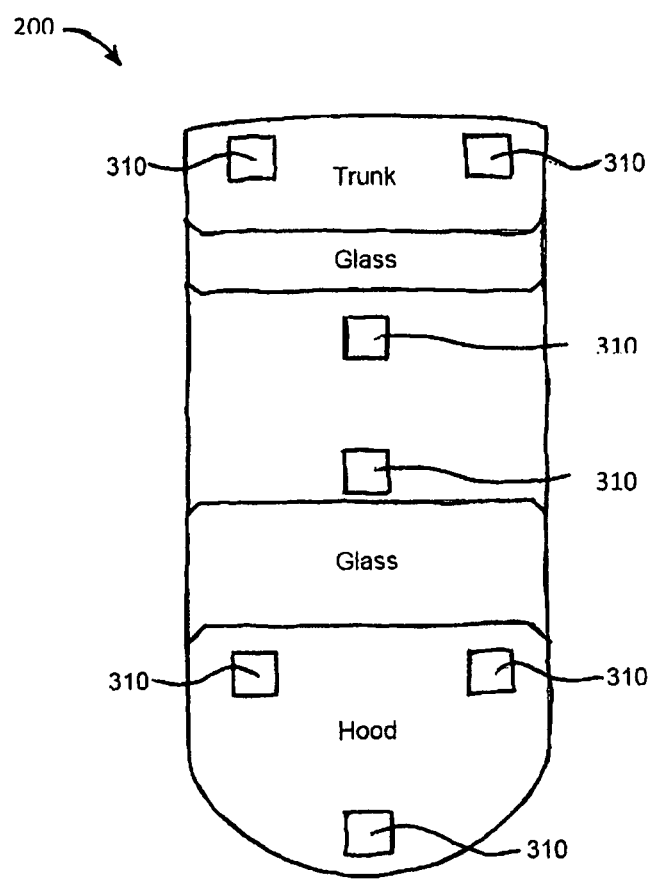
FIG. 3 is a schematic diagram showing the array of magnets across the area of the vehicle cover embedded between the bottom and intermediate cover layers according to an embodiment.

FIG. 3 is a schematic diagram showing the array of magnets 310 across the area of the vehicle cover 100 embedded between the bottom and intermediate layer 125 and bottom layer 200 according to an embodiment. Each of magnets 310 are glued to both layers and are strategically positioned throughout the area of the cover 100 to ensure the cover remains on the vehicle's surface. In a preferred embodiment, the magnets are each 2"×2" with a thickness of 3/16".

Figure 4A:
FIG. 4A is a schematic diagram of the intermediate foam layer according to an embodiment.

FIG. 4A is a schematic diagram of the intermediate layer 125 accounting to an embodiment. In FIG. 4A, the cushioning material of layer 125 is a water resistant, industrial grade foam 300. In an embodiment, the foam is glued to the magnets 310 and bottom layer 200 in order to keep the magnets 310 in their correct position. The thickness of the foam intermediate layer 300 may be varied depending on the desired level of vehicle protection. A ¼" thick foam layer would be used for more basic protection, ½" thick layer for medium protection, and a 1" thick layer for the most advanced vehicle protection.

Figure 4B:
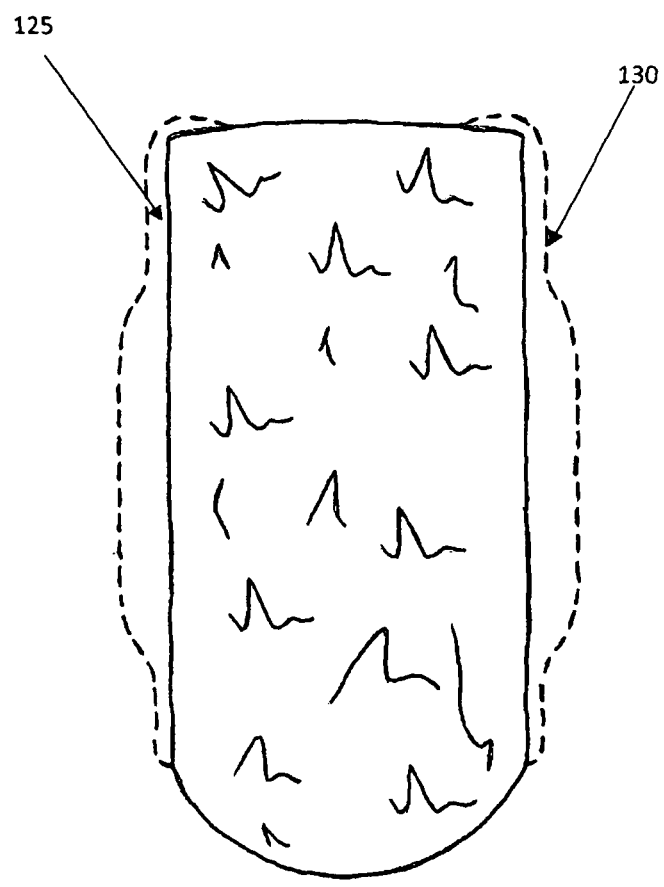
FIG. 4B is a schematic diagram of the intermediate bubble wrap layer according to an embodiment.

FIG. 4B is a schematic diagram of the intermediate layer 125 in which the cushioning material is industrial grade bubble wrap according to an embodiment. The bubble wrap 120 or foam 300 may be used as the sole cushioning material for the intermediate layer 120 or both the foam layer of FIG. 4 (A) and the bubble wrap layer of FIG. 5 may be used in tandem to provide even more protection from hail and debris. In an embodiment, the bubble wrap layer's width extends from 4 feet to 9 feet width in order to protect the vehicle's sides and fenders. In an embodiment, the bubble wrap layer is glued to the top layer 130 in order to easily match up the various layers as they are being spread over the vehicle.

Figure 5:
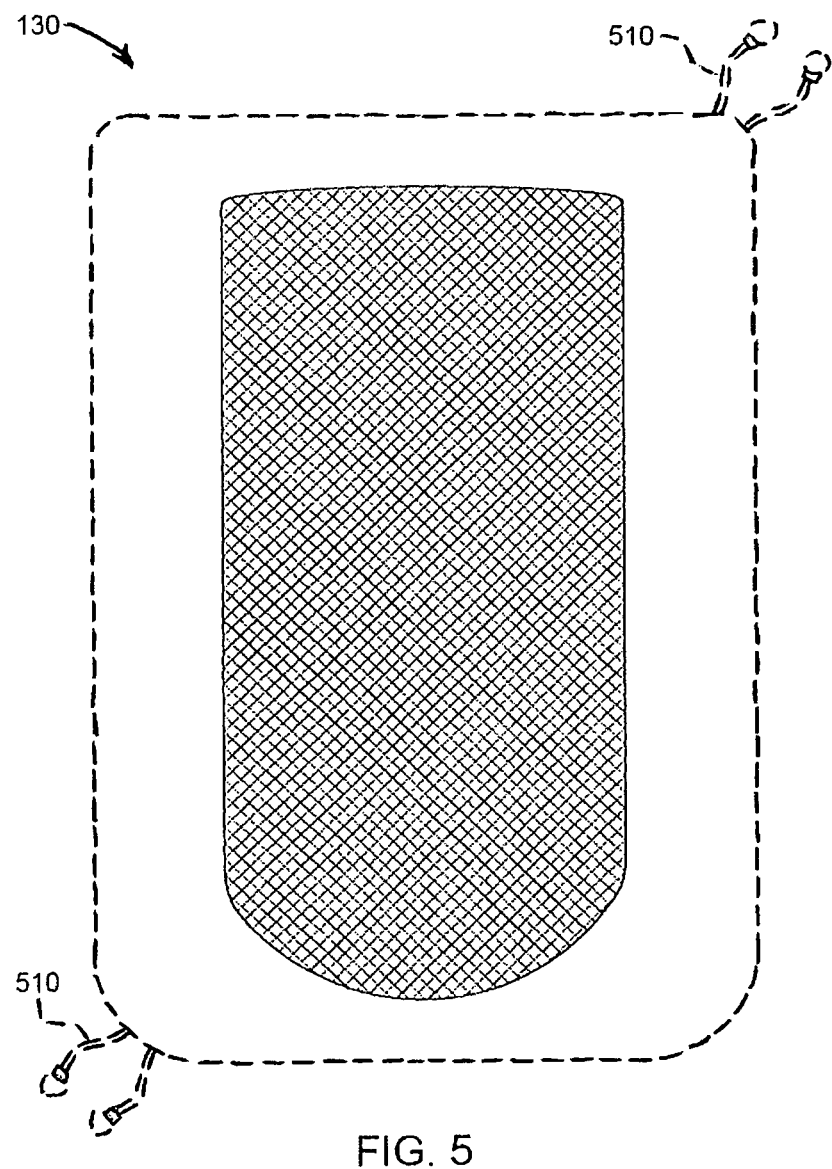
FIG. 5 is a schematic diagram of the top layer of the vehicle cover according to an embodiment.

FIG. 5 is a schematic diagram of the top layer 130 of the vehicle cover 100. The top layer 130 is designed to be far larger than the other layers in order to sufficiently surround and protect every surface of the vehicle. In a preferred embodiment, the top layer 130 is 19 feet long and 13 ft. wide. In an embodiment, the perimeter is folded and sown at the end in order for two strings 510 to be able to feed through the edge of the top layer 130. This allows the vehicle owner to tighten and tie the strings 510 for a more snug fit around the car as well as providing optimal protection from hail and debris.

In an optional embodiment, an elevation stand may be implemented in the rear or a truck bed which can allow for water or hail to run off the side and back of the truck without building up inside the truck bed itself. In an embodiment, straps, which are sewn or otherwise connected to the cover, are used in each of the corners of the cover to secure the cover to the exterior of the vehicle.

In an embodiment, the cover 100 is designed to be rolled and stored in a carrying bag (not shown). A carrying bag of dimensions 24×16×18 inches is large enough to store most sized covers.

It is important to note that the cover 100 may be used for covering a variety of items that are stored outdoors or vehicle types and is not limited to mere automotive vehicles.

Closing

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

For example, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

I claim:

1. A vehicle cover device configured to resist against hail impact damage or flying debris, comprising:
- a bottom layer comprising a water resistant polyurethane foam sandwiched by two layers of a soft fabric material configured to protect an external surface of a vehicle, wherein the bottom layer is configured to cover a top surface of a vehicle;
- an intermediate layer comprising a high-strength industrial bubble air cushion blanket, wherein the intermediate layer is configured to cover a top surface as well as sides and fenders of a vehicle;
- an outer layer secured to the intermediate layer being made from a water resistant and UV light resistant material, wherein the outer layer has a larger surface area than the intermediate layer such that the outer layer is configured to surround and protect every surface of a vehicle; and
- magnets embedded between the bottom and intermediate layers or within the bottom layer to secure the device to a vehicle's surface.

2. The vehicle cover device of claim 1, wherein the high-strength industrial bubble air cushion blanket is 3/16" thick.

3. The vehicle cover device of claim 1, wherein the soft fabric material is silk.

* * * * *